United States Patent
Arimilli et al.

(10) Patent No.: US 6,581,115 B1
(45) Date of Patent: Jun. 17, 2003

(54) DATA PROCESSING SYSTEM WITH CONFIGURABLE MEMORY BUS AND SCALABILITY PORTS

(75) Inventors: Ravi Kumar Arimilli, Austin, TX (US); Lakshminarayana Baba Arimilli, Austin, TX (US); Leo James Clark, Georgetown, TX (US); James Steven Fields, Jr., Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/436,423

(22) Filed: Nov. 9, 1999

(51) Int. Cl.⁷ .............................. G06F 13/00

(52) U.S. Cl. ..................................... 710/107

(58) Field of Search ................. 710/100, 104, 710/305, 306, 107, 113, 116, 311

(56) References Cited

U.S. PATENT DOCUMENTS

| | | | |
|---|---|---|---|
| 5,677,906 A | | 10/1997 | Hayter et al. |
| 5,771,362 A | * | 6/1998 | Bartkowiak et al. ......... 710/317 |
| 5,838,931 A | * | 11/1998 | Regenold et al. ............ 710/306 |
| 6,085,269 A | * | 7/2000 | Chan et al. .................. 710/100 |
| 6,088,751 A | | 7/2000 | Jaramillo |
| 6,148,356 A | * | 11/2000 | Archer et al. ................ 710/307 |
| 6,157,989 A | * | 12/2000 | Collins et al. ............... 709/107 |
| 6,389,493 B1 | * | 5/2002 | Barkley et al. ............. 710/110 |

* cited by examiner

Primary Examiner—Glenn A. Auve
(74) Attorney, Agent, or Firm—Casimer K. Salys; Bracewell & Patterson, L.L.P.

(57) ABSTRACT

A data processing system with configurable processor chip buses. The processor chip is designed with a plurality of extended buses of which a number are configurable buses (i.e., capable of being allocated to one of several external components, particularly memory and other SMPs). The processor chip allows for the static allocation of these configurable buses to these external components, based primarily on vendor system design preferences.

22 Claims, 5 Drawing Sheets

DATA PROCESSING SYSTEM WITH CONFIGURABLE MEMORY BUS AND SCALABILITY PORTS

The present invention is related to the subject matter of the following commonly assigned, copending U.S. patent applications Ser. No. 09/436,418 entitled "Dynamically Configurable Memory Bus and Scalability Ports Via Hardware Monitored Bus Utilizations" and filed Sep. 9, 1999. The content of the above-referenced application is incorporated herein by reference.

BACKGROUND OF THE INVENTION

1. Technical Field

The present invention relates in general to data processing systems and in particular to buses of a multiprocessor (MP) data processing system. Still more particularly, the present invention relates to a method and system for allocating buses of a processor chip between competing external components to increase overall efficiency of the data processing system.

2. Description of the Related Art

An integrated circuit (I/C) is a device consisting of a number of connected circuit elements, such as transistors and resistors and functional combinations thereof, fabricated on a single chip of silicon crystal or other semiconductor material. In integrated circuit fabrication technology, an ever-increasing number of integrated circuit devices are being built into chips. This growing number of devices typically requires a correspondingly greater number of input/output (I/O) connections to and from the chip.

Typically, the I/O connections are conductive metal pathways, connected to the metal leads protruding from the edges of the I/C chips. These I/O connections are referred to as data buses and each set of parallel data bus is characterized by the number of bits it can transfer at a single time, equivalent to the number of parallel conducting paths (which can be thought of as wires) wired to the metal leads of an integrated circuit chip. The number of these parallel conducting paths is typically referred to as the width of the bus.

The miniaturization of integrated circuits has made it possible to pack more and more data processing power into a small volume. The increased data processing power has made it necessary to provide more metal leads (I/O connections) for each I/C chip. However, the small volume of the I/C chip (i.e., small edge surface area) has also resulted in such metal leads being tightly spaced. Consequently, on a printed circuit board utilizing modern integrated circuits, the I/O connections of the I/C chips are physically very close. Accordingly, the conductive paths, at least where they connect with individual I/O connections, are also in very close proximity to each other.

It can be seen that merely from the standpoint of spatial dimensions, there has to be an upper limit of the amount of conductors that can be placed in parallel. However, long before that spatial limit is reached, electromagnetic interference (e.g., coupling effects) between such parallel conductors starts to impinge upon the effectiveness of data transmission, since at some point such interference effects make the placing of more conductors in parallel impractical.

While the limit of number of conductors practicably connected in parallel is rapidly approaching, the processing power of integrated circuits continues to increase and the volume of the I/C chip continues to shrink. Also, each advance in integrated circuit technology typically requires an increase in bus width to transmit the processed data on and off chip; that is, data bus requirements of integrated circuits have gone from 16 to 32 to 64 to 128 line buses, with some of the more recent advances requiring 256 lines or higher, with no end to bus requirements in sight.

One common I/C chip is the processor chip utilized within a data processing system. Current designs of data processing systems involve coupling together several of these processor chips to create multi-processor data processing systems (or symmetric multiprocessor (SMP) data processing systems). In conventional symmetric multiprocessor (SMP) data processing systems, all of the processors are generally identical. The processors all utilize common instruction sets and communication protocols, have similar hardware architectures, and are generally provided with similar memory hierarchies. For example, a conventional SMP data processing system may comprise a system memory, a plurality of processing elements that each include a processor and one or more levels of cache memory and a system bus coupling the processing elements to each other and to the system memory.

Traditionally data processing systems were designed with single processor chips having one or more central processing units (CPU). In these traditional single chip data processing systems, all bus interfaces were utilized by memory, other caches, and input/output (I/O) devices. With the fast growth of multi-processor data processing systems and the corresponding need for additional processing power, new multi-chip modules comprising multiple processor chips were developed. Building larger scalable SMPs requires the ability to hook up multiple numbers of these chips utilizing the bus interface. In order to accommodate these other devices, the size of the memory bus interface was reduced and these bus interfaces were utilized for the other external components, particularly other SMPs. In these multi-chip modules, certain of the buses traditionally dedicated to memory processes such as data transfer have been dedicated to connecting other processor chips (i.e., processors located on other chips). With the allocation of memory buses to these chips due in part to limitations in the size of the chip (i.e., it is impossible to add new buses to the already compressed design of the chip), current data processing systems processor chips operate with a smaller bus bandwidth made available to the memory processes.

With the traditional configuration of a SMP, the chip's I/Os are utilized by all external components connected to the system bus which communicate with the processor. This is referred to as a tri-state topology. Each external component can send and receive information via the system bus and chip I/Os. However, this topology works well only in the slower processors. As previously mentioned, the processor speed is steadily increasing, resulting in each component requiring wider and dedicated bandwidth. Unfortunately, tri-state topology systems are unable to efficiently handle the greater demands on the buses because they are unable to scale at the same level as the processors. These higher frequency processors, such as those operating at 1 Ghz, have necessitated the development of a point-to-point topology, wherein the buses are separately and distinctly allocated to a specific external component. In this topology, some I/Os are utilized for direct connection to memory, other pins for additional processors in multi-processor chip systems, and still others for I/O components. Thus, in point-to-point topology, the I/O pins are predetermined/pre-allocated for connection to a specific external component. Notably, the I/Os for memory and those for other processors are utilized as buses which are distinct and separate.

Typically, processors and higher level caches are located on a processor chip, which is designed with a plurality of buses extending off of the edges of the chip. These chips in turn have a set of dedicated buses through which the processors communicate to external components such as memory, input/output (I/O) devices and other processors. Traditionally, the allocation of these buses is predefined during the design and development stage. In a distributed memory system, for example, a set number of chip I/Os are designed for memory access while another set of chip I/Os are designed for connection to the other external components, such as other processors in a multi-chip configuration.

These bus interfaces connecting other chips are interchangeably referred to as scalability ports, as they allow the processor to be expanded to include other processors in a multi-processor module. In the standard SMP design, one bus on the processor chip is specifically allocated to a one-to-eight-way symmetric multiprocessor (SMP). In another common design, a second bus is allocated to accommodate an eight-to-thirty two (8–32)-way SMP. This 8–32-way bus may be infrequently utilized since most systems are typically 1–8 way SMPs.

Thus current processor chips are designed with fixed dedicated buses which handle either memory transactions or SMP processor transactions. Often, changes in demands for bandwidths occur and there are times when the memory requires more bandwidth (i.e., a larger number of available buses than is available in a fixed-configuration bus allocation) while the SMP requires even less bandwidth than is provided in a fixed-allocation chip configuration. Alternatively, the memory may require less bandwidth while the SMP requires more bandwidth. This condition becomes more frequent today given the bursty nature of traffic (data and other workloads) due in part to the characteristics of Internet based and other similar applications. Thus there are peaks and valleys in the workload and the corresponding requests for bandwidth from the memory and other processors. Presently there is no way of determining the needs of the system with respect to increased bandwidth to the memory buses versus bandwidth use by the SMP buses. Neither is there any method, system, or processor design which allocates buses of a chip based on the actual needs of the overall system. Efficiency in the processor and overall system is lost due to the rigidity of present chip designs.

The present invention thus recognizes that it would be desirable to have a data processing system which allocates processor chip I/Os to memory components, I/O components, and other processor chips based on overall system (or processor) needs. It is also desirable to have a method and system for dynamically configuring a bus allocation of a processor chip utilizing hardware/and or software allocation methods, (i.e., static and dynamic allocation mechanisms). It would be further desirable to allocate processor chip bus bandwidth in such a manner that the efficiency of the processor and the overall data processing system is enhanced.

SUMMARY OF THE INVENTION

It is therefore one object of the present invention to provide an improved data processing system.

It is another object of the present invention to provide an improved method and system for bus allocation on a multiprocessor (MP) data processing system;.

It is yet another object of the present invention to provide a method and system for statically allocating buses of a MP chip between competing external components to increase overall efficiency of the data processing system.

The foregoing objects are achieved as is now described. A data processing system with configurable processor chip buses is described. The processor chip is designed with a plurality of extended buses (I/Os) of which a number may be statically allocated to memory (or other component) and the remainder may be allocated to other SMPs. A number of the buses are designed as configurable/floating buses. The processor chip allows for the static allocation of these configurable buses to either component.

In one embodiment, a single bus is hardware configurable and is allocated to memory via hardware manipulation. In another preferred embodiment, the configurable buses are allocated based on a software manipulation of a bus allocation unit during chip initialization. In yet another embodiment, the configurable bus is statically allocated during assembly of the processing system or during power-on-reset to create vendor specific bus allocation topology.

The above as well as additional objects, features, and advantages of an illustrative embodiment will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF ILLUSTRATIVE EMBODIMENT

Figure 1A:
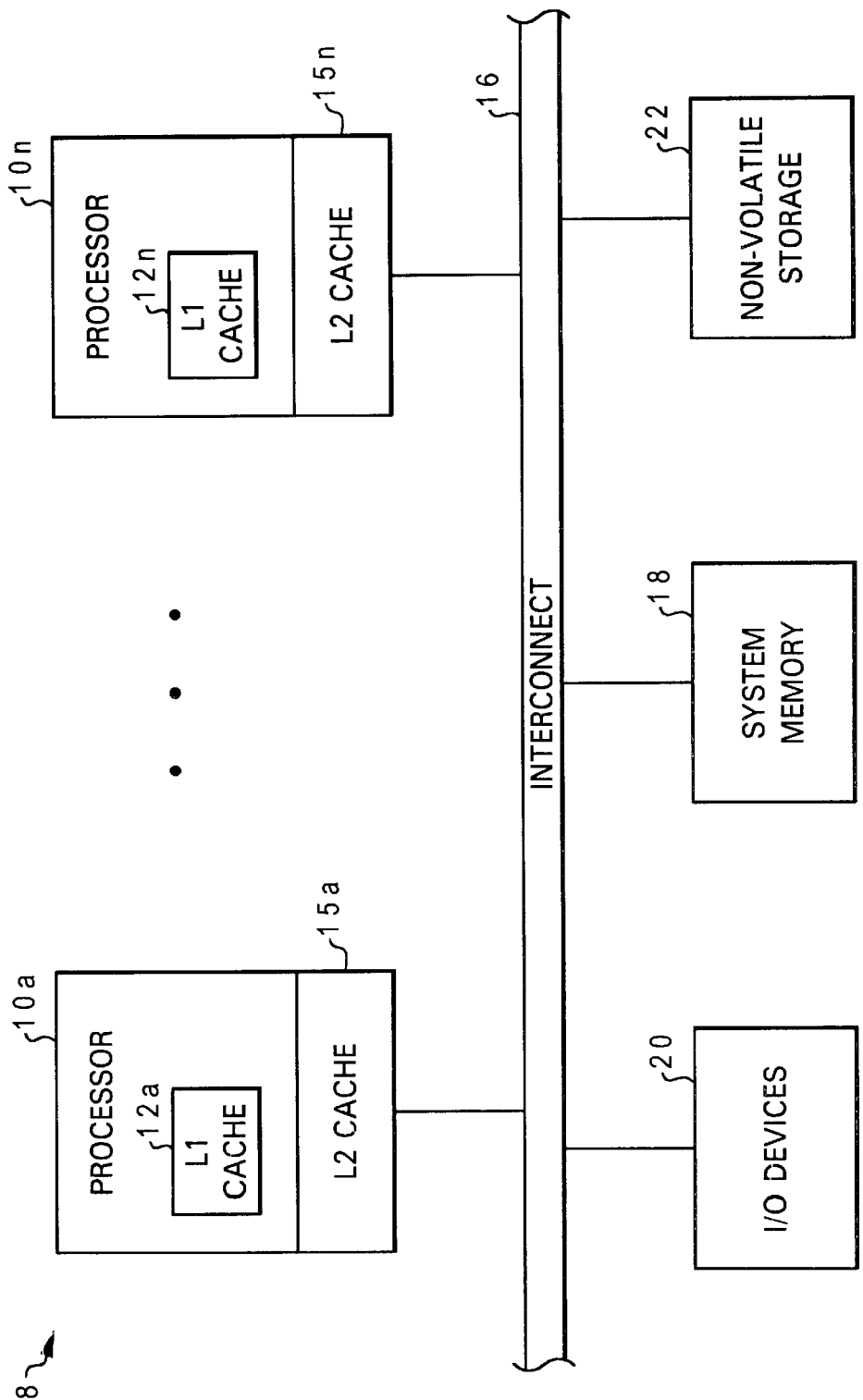
FIG. 1A depicts a high level block diagram of a multi-processor data processing system.

With reference now to the figures, and in particular with reference to FIG. 1, there is illustrated a high level block diagram of a multiprocessor data processing system in accordance with the present invention. As depicted, data processing system 8 includes a number of processors 10a–10n. Processors 10a–10n preferably comprises one of the PowerPC™ line of microprocessors available from International Business Machines Corporation; and are superscalar with full out-of-order execution. Those skilled in the art will appreciate that other suitable processors can be utilized. In addition to the conventional registers, instruction flow logic and execution units utilized to execute program instructions, each of processors 10a–10n also include an associated on-board level one (L1) data caches 12a–12n, which temporarily holds data that is likely to be accessed by the associated processor.

As illustrated, data processing system 8 further includes input/output (I/O) devices 20, system memory 18, and non-volatile storage 22, which are each coupled to interconnect 16. I/O devices 20 comprise conventional peripheral devices, such as a display device, keyboard, and graphical pointer, which are interfaced to interconnect 16 via conventional adapters. Non-volatile storage 22 stores an operating system and other software, which are loaded into volatile system memory 18 in response to data processing system 8 being powered on. Of course, those skilled in the art will appreciate that data processing system 8 can include many additional components which are not shown in FIG. 1, such as serial and parallel ports for connection to network or attached devices, a memory controller that regulates access to system memory 18, etc.

Interconnect (system bus) 16, which can comprise one or more buses or a cross-point switch, serves as a conduit for communication transactions between processors 10a–10n, system memory 18, I/O devices 20, and nonvolatile storage 22. A typical communication transaction on interconnect 16 includes a source tag indicating the source of the transaction, a destination tag specifying the intended recipient of the transaction, an address, and data. Each device coupled to interconnect 16 preferably snoops all communication transactions on interconnect 16.

The execution circuitry of processors 10a–10n each comprises multiple execution units, including two fixed-point units (FXU), two load/store units (LSU), and two floating-point units (FPU). As is well-known to those skilled in the computer art, each of the execution units typically executes one or more instructions of a particular type of instructions during each processor cycle.

As its name implies, LSU typically executes load and store instructions which either load data from L1 cache or memory (i.e., either L2 data cache 15a . . . 15n or main memory) into selected GPRs, GPR rename buffers, FPRs or FPR rename buffers, etc., or which store data from a selected one of GPRs, GPR rename buffers, FPRs, or FPR rename buffers, etc., to memory. The present invention configures the bus interfaces to the selected buffers to allow for greater bandwidth for transferring data to and from memory when required.

Although the invention is being described with reference to the above mentioned data processing systems, these references are in no way meant to be limiting on the invention. Other system types and architecture may be utilized in implementing the invention. For the most part, the system is described with reference to a multi-processor topology or SMP topology. It is to be appreciated that the present invention finds applicability in a uniprocessor system. Allocation of buses between memory and other I/O components may also involved allocation of configurable buses between these units. Further, it is conceivable that a uniprocessor system may be expanded to become a multi-processor system and that having a configurable bus allows the expansion to occur post assembly, while providing the memory use of all the buses prior to such expansion. Those skilled in the art will appreciate the various alternative embodiments which may not be specifically presented fall within the spirit and scope of the invention in light of those embodiments which are disclosed.

Figures 1B, 1C:
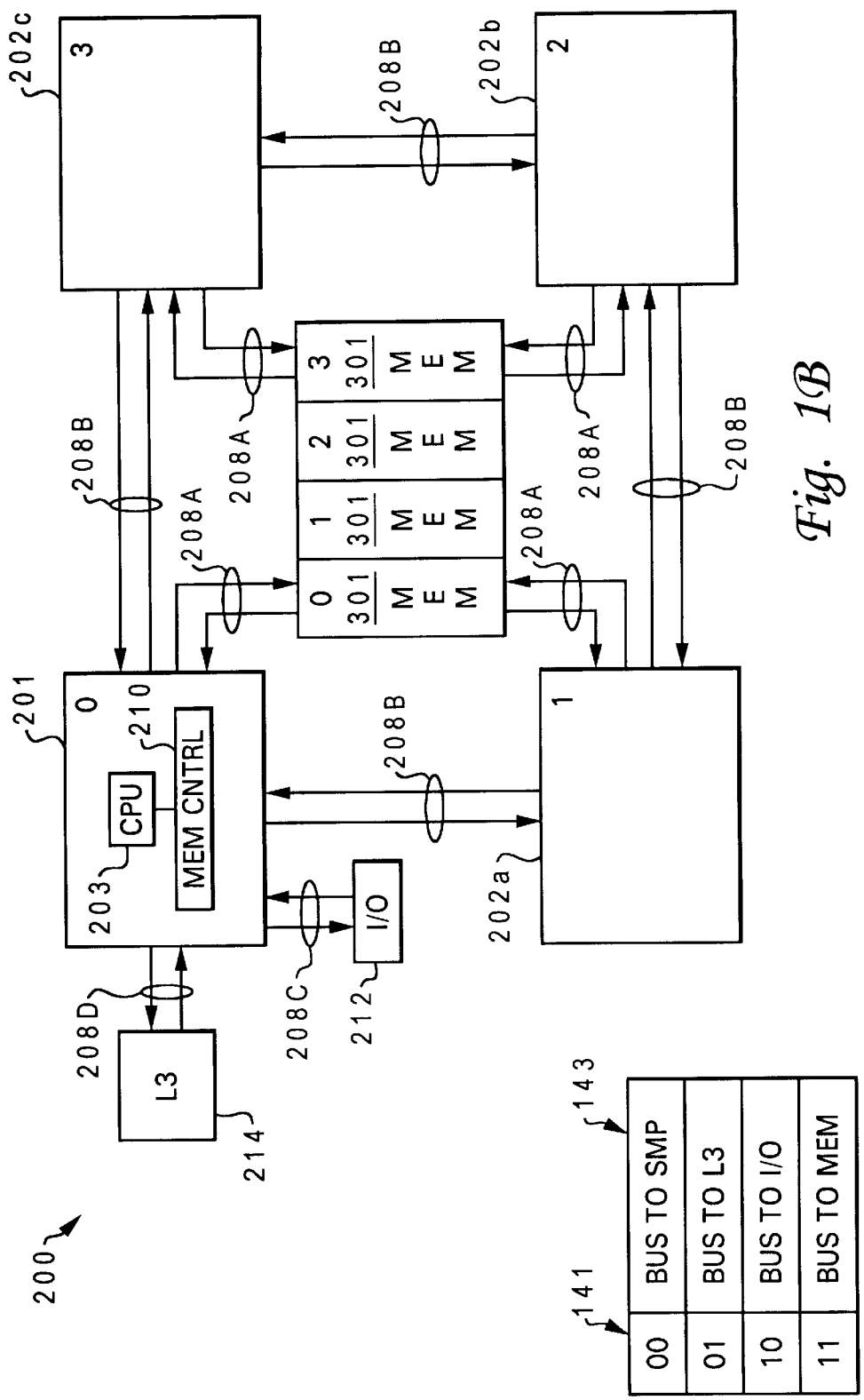
FIG. 1B depicts a multi-chip multiprocessor configuration of a symmetric multiprocessor (SMP) data processing system in which the present invention may be implemented.
FIG. 1C depicts a two-bit mode flag utilized in one embodiment of the present invention.

FIG. 1B illustrates a multi-chip multiprocessor topology 200 comprising of a first processor chip 201 having an on-chip processor (CPU) 203 and several other processor chips 202a–202c. First processor chip 201 is coupled to other devices via its bus connectors 208A, 208B, 208C, and 208D. A first set of buses 208A provide the connection to memory 301. Memory 301 is represented as four sub-blocks which connect to individual processor chips and combined to form the entire system memory. Those skilled in the art are familiar with a distributed memory topology and its characteristics.

One set of the remaining buses 208B are utilized to connect to other processor chips 202a–202c, a second set 208D is connected to lower level (L3) cache 214, while a next set 208C is connected to I/O components 212. In this embodiment, three (3) additional processor chips 202a–202c are connected to processor chip 201. The one set of remaining buses 208B are typically a smaller number (i.e., less bandwidth) than first set of buses 208A. Some, or all, of the number of remaining buses 208B (i.e. buses allocated to the other processors) are pre-set based on the design parameters of the processor chip 201. Processor chip 201 contains memory controller 210 which directs the transfer of requests and data between processors 203 and memory 301, respectively. Processor chip 201 may also contain additional components due in part to heavy integration under new silicon technology.

This invention provides a data processing system processor chip which has at least one configurable bus, which may be allocated to various external components, particularly memory and other SMPs. The primary embodiments described herein will be describe with reference to an allocation of configurable buses between a memory and other SMPs; however those skilled in the art will appreciate that other external components may also be vying for use of the configurable bus(es) (desirous of more bandwidth) and may be included in the allocation determination in a more complex embodiment. Several of these alternate embodiments are briefly described later.

The invention in its implementation, effectuates a scalability port (bus) allocation on a processor chip to improve chip efficiency and counter-act load imbalances on a chip. The invention may be statically implemented during chip design and subsequent assembly of data processing systems. The invention may also be dynamically implemented with on-chip logic or specific software commands. The configuration of a dynamic allocation bus is workload dependent. The invention provides the ability to trade off processor-memory data bandwidth and processor-processor bandwidth.

In one embodiment, the invention is primarily implemented via hardware configuration during chip design and manufacture. The chip is designed with one or more configurable (or floating) buses, (the number is dependent on the manufacturer preference and the type of chip desired) which are dynamically controlled by an on-chip bus allocation logic (located within a bus allocation unit) or statically controlled during system assembly or on power-on-reset. As illustrated in FIG. 2B, the bus allocation unit has a set of registers 215 and logic components which permit the selection of a configurable bus for utilization as an interface/connector to a particular external component. The bus allocation unit also has logic 216 for determining priority based on specific needs of each external unit vying for the additional bus bandwidth. The registers 215 hold the current setting of the buses and their values can be change by software or hardware. In the preferred embodiment, processor chip 201 also has a mode bit (described below) which tells the processor how the ports are configured (e.g., bandwidth allocated to the various external units).

In a static implementation of the invention, which represents a primary implementation, a chip manufacturer creates the chips with configurable buses and provides the chips to various data processing system vendors. The configurable buses maybe set using pins 221 located on the chips. These pins 221 may be set to an "off" (0) or "on" (1) position representing allocation of an affiliated bus to memory or other processors respectively. FIG. 2C illustrates this configuration and is described below. Thus a pin in the "off" position may represent use of that bus for memory while the pin in the "on" position represents use of the bus for other processor connections. Only one pin may control a number of configurable buses, or alternatively, each configurable bus may have its own individual pin. The vendor selects the particular configuration desired and sets the pins during assembly of the data processing systems. (i.e., The vendor configures the buses prior to installing the chips in the vendor's data processing systems). Thus Compaq Computers may set the pins to on to effectuate a wider processor to processor bus, while IBM may set the pins to off to effectuate a wider memory bus. Another vendor may share the buses equally between the memory and the other processors. In this static representation, each vendor is thus able to select a specific topology of data processing system based on the bus configurations.

A series of bits, referred to herein as allocation mode bits are utilized to signal to the processor what configuration is presently being utilized by the buses. These bits are stored in a register 215 and maybe related to the chip pins of the static implementation. Alternatively, they may be separate bits utilized by the bus allocation unit in the dynamic implementation. In one embodiment, a vendor micro-code is encoded in the initialization logic stored in read only memory (ROM) of the data processing system. This vendor micro-code operates to set the chip's configuration feature on or off by setting the value of the registers during power-on-reset sequence. When a power-on-reset sequence occurs, the hardware is initialized by the boot code to reflect the vendor's desired system boot up configuration. This operates to set the pins; however, the power-on-reset sequence may be designed to operate without pins by setting the registers directly. In this embodiment, different signals may be utilized. A single pin or register may be used to indicate to the processor which mode the chip is in (i.e., static or dynamic) or the pins or registers could be used to actually present the desired configuration.

In the later embodiment, one set of values utilizing a two-bit mode register 141 is presented in FIG. 1C along with the corresponding meanings 143. Four possible allocation of configurable buses are presented, based on a representation of four different external components vying for additional bandwidth. Hence, for example, if the configurable bus is allocated to give priority to other SMP processes, the two-bit mode register may be set to 00, while if the bus is allocated to the memory unit, the mode register is set to 11, etc.

Another embodiment of the invention is software implemented. The bus configuration is determined by modifying the instruction set architecture (ISA), to include a bit which may be set during compilation of program code/instructions. Hence, the ISA may have certain hint bits (allocation bits) which are read by the processor (or the bus allocation unit) and utilized to determine how the floating buses are allocated. The allocation bits are set with a priority value during compilation of the program instructions. Alternatively, a separate allocation mode instruction may be issued during compilation and sent to the bus allocation unit at specified times during program execution. The software implementation allows a dynamic allocation mechanism to be influenced by the actual requirements of the program/code running on the data processing system. The priority value then forces the bus allocation unit to allocate floating buses to particular external components. This allow the program to be run most efficiently as it is able to determine, based on specific knowledge of the needs of the program application, which method of bus allocation to implement at specific times during program execution. The compilation mechanism is provided with data related to the physical capabilities of the hardware (i.e., the SMP processing power, speed, and ideal bandwidth requirements).

The use of the term software in the invention is however not limited to program applications. Software may also be the operating system and middleware, such as ORACLE®. The software may cause the buses to be allocated in a particular desired configuration by forcing the bus allocation unit to set the registers or pins to reflect the desired configuration.

Figure 2A:
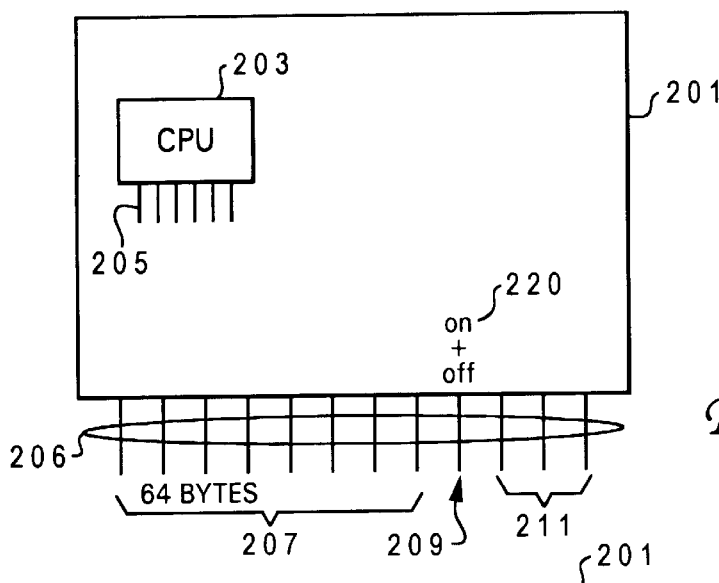
FIG. 2A is a block diagram of a processor chip with a single bus scalability configuration in accordance with one preferred embodiment of the present invention.
Figure 2B:
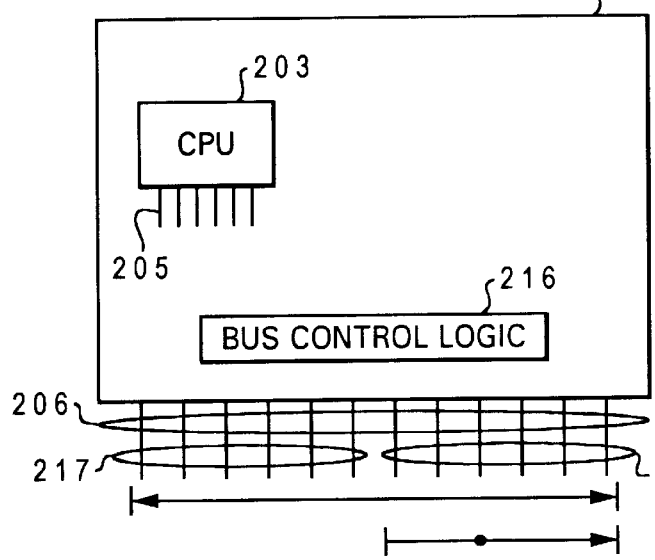
FIG. 2B depicts a processor chip similar to that of FIG. 2A with a multi-bus scalability configuration in accordance with a preferred embodiment of the present invention.
Figure 2C:
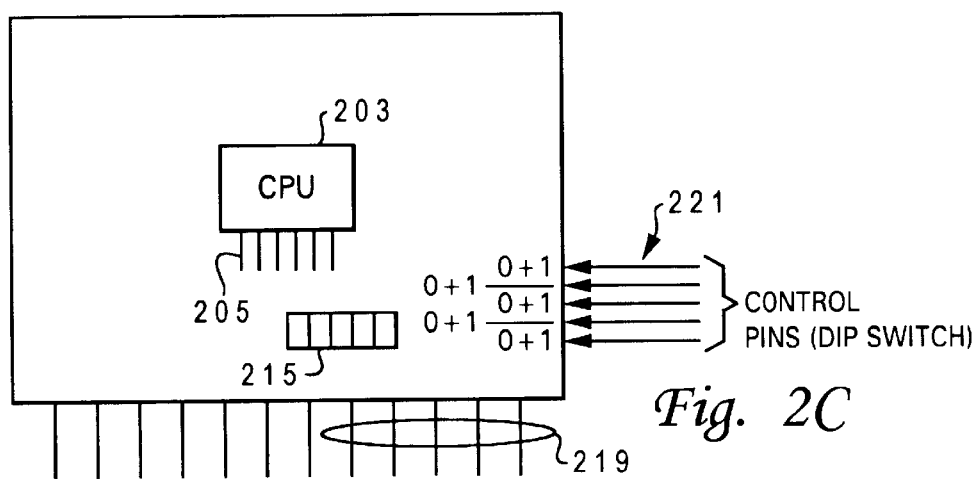
FIG. 2C depicts a processor chip similar to that of FIG. 2B with mode control pins and register according to one embodiment of the present invention.

Turning now to FIG. 2A, one embodiment of the invention is illustrated. In this embodiment, a single bus, utilized as a configurable/floating bus, is allocated based on the bandwidth/loading requirements of the memory and/or other processor chips. Processor chip 201 is depicted having an on-chip processor (central processing unit (CPU)) 203. CPU 203 has associated wired connections 205 for connecting to on-chip components such as a memory controller, bus allocation unit, and L1 and L2 caches, etc. (not shown). Processor chip 201 also has a plurality of bus ports (I/Os) 206 by which it connects to external components. In this embodiment, bus ports 206 are comprised of memory buses 207, other processor chip buses 211 and floating (or configurable) bus 209. Each bus contributes an associated bandwidth for transfer of data or other information to and from the chip. Together, the memory buses 207 create a 64-byte bandwidth for transfer of requests and data to and from the processor chip 201. Likewise, the SMP buses create an X-byte bandwidth for connecting to SMP processors, where X may be 1–8 bytes or more. In this embodiment, a first pair of buses is dedicated to a 1–8 Byte SMP connection, while a third configurable bus may be utilized for 8–32 Byte SMP connection. Also, control of the floating bus 209 (i.e., allocation of the floating bus) may be completed statically using pin 220 to enable increasing (or widening) of either the memory bandwidth 207 or SMP bandwidth 211. Pin 220 may be set in either the "off" or "on" position in one of several ways which are described below.

FIG. 2B illustrates a multi-scalable bus allocation chip design. Processor chip 201 has basically the same design structure as that of FIG. 2A; however, none of the SMP buses are preassigned. A set number of buses 217 are allocated to memory, and a subset of buses 218 are floating (although all buses 206 may be floating (configurable), as illustrated by the arrows below the figure). To enable this embodiment, additional logic unit, bus allocation unit 216 having bus allocation logic is present on-chip as discussed above. In one embodiment, bus allocation logic 216 is included as a part of the memory controller's logic.

FIG. 2C illustrates the chip of FIG. 2B in a static representation wherein the SMP buses are controllable via external controls. The bus allocation unit of FIG. 2B is replaced by a series of mode control pins 221 capable of being in an on (1) or off (0) mode. Each mode control pin 221 controls the allocation of a particular configurable bus or a group of configurable buses 219. In this illustration, five (5) mode control pins 221 are utilized to control five configurable buses 210. These mode control pins 221 may alternatively be utilized as a switch mechanism, thus allowing for a granularity of combinations. For example, since each pin in the five pin group may be set with a value of 1 or 0, every combination beginning with 00000 through 11111 is possible and each combination may represent a different configuration of the configurable buses 210. Thus $2^N$ configurable states are possible, where N represents the number of mode control pins.

The values of the pins may be set by the vendor via external manipulation or programming during manufacture. Alternatively, the values may be set by the bus allocation unit during processing. Both embodiments may co-exist allowing both static and dynamic configuration of buses on a chip. The bus allocation unit may be made to override the pin configuration or be operable only when the pins are set to a particular value, such as 00000. The bus allocation unit may also be coupled to the pins in such a way as to control the pins to effectuate the bus configuration. In one implementation, one bit may be utilized in the register to indicate whether to allocate buses based on the static pin configuration or the dynamic configuration.

Connection to SMP processors are not always required by processor chips. In the implementation in which all the buses are configurable, no bus is assigned to SMP when it is not required or alternatively when the memory requirements for bandwidth supersede all possible requirements for additional processors. During implementation, as the workload changes (i.e., decreases), less memory bandwidth is required and additional SMPs may be desired to improved processing efficiency. In the preferred embodiment, addition of each SMP results in reduction of memory buses on the specific processor chip; However, the overall system memory bandwidth is not reduced by adding more SMPs because the added SMPs in turn have memory bandwidth. For the illustrated example, up to six bus ports may be utilized for additional SMPs but it is conceivable that no bus port is utilized for an SMP connection as discussed above.

Figure 3A:
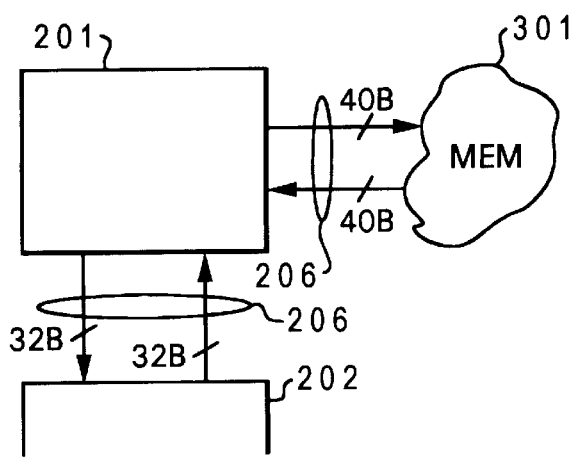
FIGS. 3A, 3B, and 3C depict block diagrams of a dynamic bus allocation of a 72-byte bus bandwidth in accordance with one embodiment of the present invention.
Figure 3B:
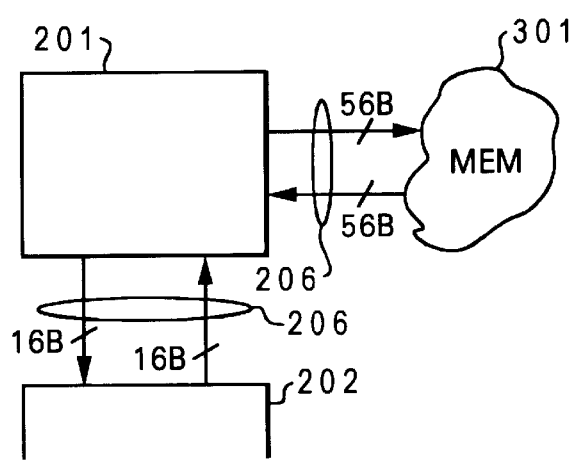
Figure 3C:
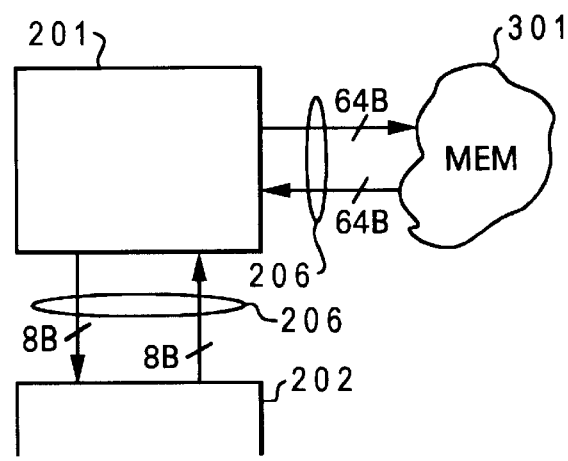

Turning now to FIGS. 3A–3C, there is illustrated a three step gradation of allocating a 72 byte total bus bandwidth between memory and other SMPs. In order to complete this progression with respect to the allocation of buses, it is understood that each configurable bus running from the processor chip has connections, either directly or through a switch, to both the memory and other SMP. Only the powering/allocation of wires at the chip changes. Each of the configurable buses is allocated at any point in time to a single component, but the specific component to which they are allocated is different with each configuration. Thus, an allocation of a configurable bus to memory necessarily involves a de-allocation of that bus from the other SMP, and vice versa. Buses are individual data lines or collection of data lines having a particular bandwidth. As more data lines are brought together, the overall bandwidth of the bus increases. The illustrations of FIGS. 3A–3C depict single directional buses to and from each component. The actual number of data lines which comprise these buses are not represented; however, those skilled in the art understand that a bus width (bandwidth) is variable based on the total number of data lines present within the bus. FIGS. 3A–3C presents illustrations in which some of the data lines within each bus are configurable. Each bus is made up of a pre-selected total number of data lines (including configurable data lines) coupling together each component. At any given time, some of the configurable data lines may be utilized, increasing the bandwidth of the bus. For example, an increase in memory bus bandwidth from 40 Bytes to 56 Bytes represents an allocation of an additional 16 Bytes of data lines within the bus. This is implemented by allocating 16 Bytes of configurable bus to the memory and thereby de-allocating the similar number of configurable buses (i.e., representing 16 Bytes) from the other SMP. The number of configurable data lines allocated within each bus is controlled by the bus allocation unit.

In FIG. 3A, the buses of the processor chip 201 are allocated almost equally (i.e. 40 bytes–32 bytes) between memory 301 and other SMPs 202. In FIG. 3B more bandwidth (i.e., 56 bytes to 16 bytes) is allocated to memory 301. In FIG. 3C, the memory 301 is allocated most (64 bytes) of the bandwidth. The bandwidth requirements for other SMP will rarely be greater than, or even equal to, that of memory as presented in FIG. 3A. FIG. 3B more accurately represents the ratios present in current designs. Thus although the invention covers the transition from any one of the three presented representations to another, based on the number of configurable buses and the system loading requirements, the most likely scenario during implementation of the invention is the transition between FIGS. 3B and 3C. As described above, the process of increasing/decreasing allocated bandwidth occurs with allocation of data lines which make up the buses to specific components.

Figure 4:
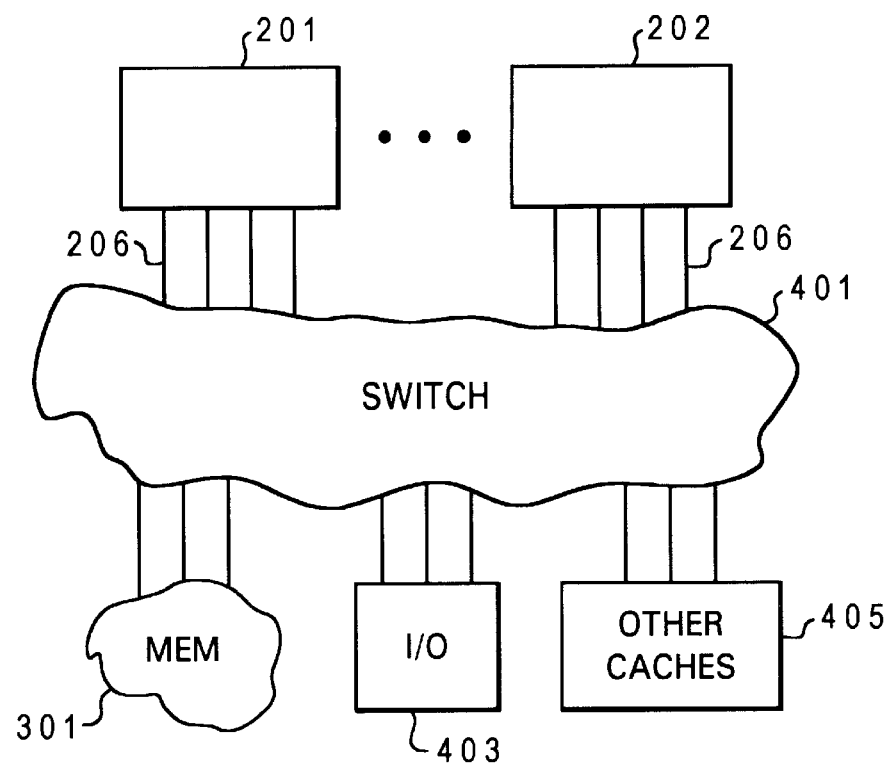
FIG. 4 is a block diagram illustrating a switch mechanism for implementing a dynamic bus allocation in accordance with one embodiment of the present invention.

FIG. 4 illustrates the dynamic allocation of bandwidth utilizing a switch topology. This preferred embodiment allows the dynamic changing of hardware based on the monitoring of the usage of the buses by the external components. Switch 401 is a logic unit/point at which the various buses (I/Os) 206 running from the processor chips 201 and 202, as well as memory 301, I/O devices 403 and other caches 405 terminate. Switch 401 may be located on the external system bus of a multiprocessor data processing system. Switch 401 may house the bus allocation logic/units or other component which determines the priority of each process, request and data transfer on the system. The basic functional elements of the switch are described below with reference to FIG. 6.

Figure 5:
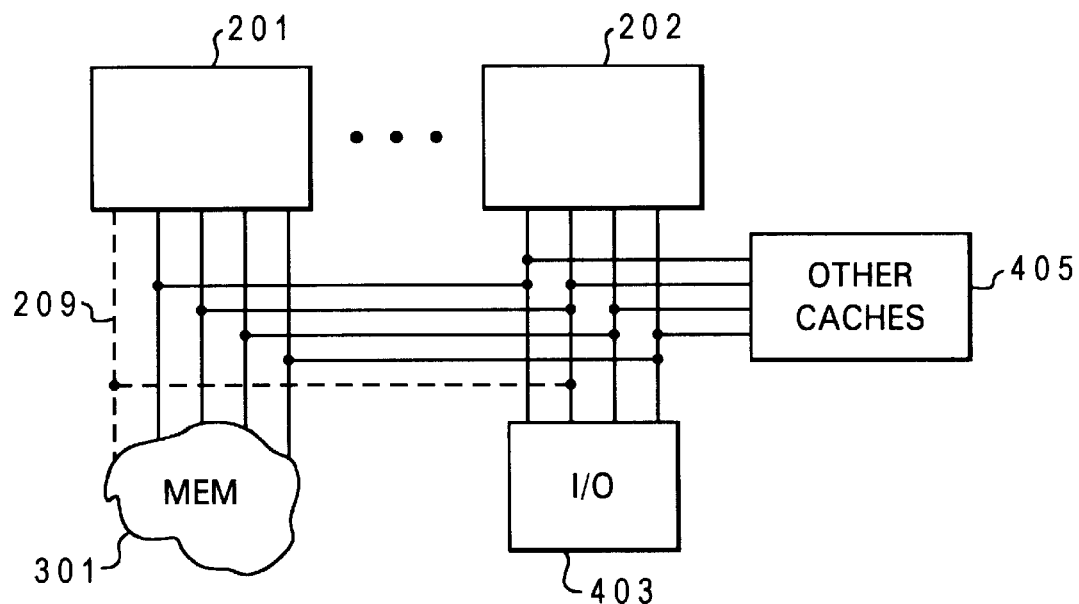
FIG. 5 depicts a single scalability bus representation of the dynamic switching mechanism in accordance with one embodiment of the present invention.

FIG. 5 illustrates another embodiment using a dynamic allocation mechanism. In this embodiment, processor unit 201 has four connected 8 byte buses which are utilized for general connections to the external components including memory 301, other SMP 202, I/O devices 403, and other caches 405. In this embodiment, processor chip also has a floating 8-byte bus 209 which is allocated as necessary to one of the external components. Floating 8-byte bus 209 is managed dynamically by hardware and/or software. The transitioning among configurable states continues during system processing. A feedback mechanism may be built in which permits the configurable buses to revert back to a preferred configuration after an initial switching in response to changing demands; however, the dynamic nature of system processing may make this feature unnecessary in very active processors.

Figure 6:
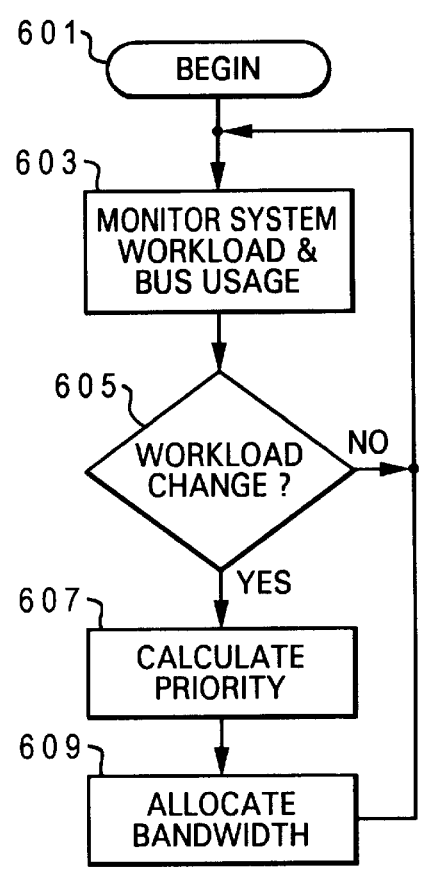
FIG. 6 is a flow chart of the process of determining an allocation of buses in accordance with one embodiment of the present invention.

FIG. 6 is a flow chart of the process of dynamically allocating bandwidth utilizing a switch topology of FIG. 4. The process begins (step 601) with the switch monitoring the bus usage on the system (step 603). A check is made for when there is a change in workload demand (i.e., change in required bandwidth) (step 605). When a workload change is detected (i.e. more memory data bandwidth requested or more processing power bandwidth requested), the logic within the switch topology calculates a priority of the various external components (step 607). Finally, the switch system allocates the available configurable buses (step 609) based on the results of the priority determination. In the preferred embodiment, the priority determination calculates based on the most efficient use of the processor's bus bandwidth, thus resulting in faster processing within the system.

In one embodiment, the process includes the steps of determining whether the allocation measure is static or dynamic. In another embodiment, the process further includes determining whether the logic within the switch topology is being controlled by the software instructions or the hardware bus allocation logic/unit. In other embodiments, the steps further include determining the number of buses which are allocatable (i.e., configurable) and which number to allocate to which external components. It is expected that in a multi-scalable bus allocation configuration, that some of the configurable buses are allocated to one external component, while the other configurable buses are allocated to another external component.

As a final matter, it is important that while an illustrative embodiment of the present invention has been, and will continue to be, described in the context of a fully functional data processing system, those skilled in the art will appreciate that the software aspects of an illustrative embodiment of the present invention are capable of being distributed as a program product in a variety of forms, and that an illustrative embodiment of the present invention applies equally regardless of the particular type of signal bearing media used to actually carry out the distribution. Examples of signal bearing media include recordable type media such as floppy disks, hard disk drives, CD ROMs, and transmission type media such as digital and analogue communication links.

While an illustrative embodiment has been particularly shown and described, it will be understood by those skilled in the art that various changes in form and detail may be made therein without departing from the spirit and scope of the illustrative embodiment. Most notably, although the invention has been described with reference to memory and other SMPs as the external components, the invention can be implemented with other external components, such as the I/O and lower level caches. Further, there is no requirement that the other processors be SMP processors. Those skilled in the art can appreciate that other multi-processor configurations may be utilized in the implementation of the invention.

What is claimed is:

1. A multiprocessor data processing system comprising:
    a first processor chip having at least one processor and a plurality of bus interconnects utilized for connecting said processor to external components of said first processor chip, wherein at least one of said bus interconnects is a configurable bus interconnect;
    a memory component external to said processor chip and coupled to said processor chip by at least one of said plurality of bus interconnects;
    a second processor chip external to said first processor chip and coupled to said first processor chip by at least one of said plurality of bus interconnects;
    means for determining a priority between a bandwidth requirement of said memory component and a bandwidth requirement of said second processor chip;
    means for assigning said configurable bus interconnect to said component determined to have a higher priority.

2. The data processing system of claim 1, wherein said determining means includes:
    means for monitoring system bandwidth requirements at a bus allocation unit; and
    means for comparing said bandwidth requirement of said memory component with a second processor chip bandwidth requirement based on processor needs, wherein said assigning means is responsive to a result of said comparing means to permit greater efficiency in system processing.

3. The data processing system of claim 1, wherein said plurality of bus interconnects includes at least two configurable buses, said determining means further includes means for determining a number of said configurable buses to assign to each of said memory component and said second processor chip, wherein less than all of said configurable buses may be assigned to a single component.

4. The data processing system of claim 1, wherein said assigning means further includes means for setting a mode register within a bus allocation unit, said mode register indicating to a processor of said first processor chip a present configuration of said plurality of buses.

5. The data processing system of claim 4, wherein said setting means further includes:
    a plurality of mode control bits; and
    means for assigning a value to each of said mode control bits, wherein said value is assigned via external programming and said value is stored within said mode register.

6. A method for configuring bus interconnects on a processor chip, said method comprising the steps of:
    designing said processor chip with at least one configurable bus that connects said processor chip to one of a selection from among another processor, memory and I/O; and
    allocating, based on vendor specific factors, each of said at least one configurable bus to a selected one of a plurality of possible external components that may be coupled to said processor chip via said bus interconnects, said plurality of possible external components including said other processor and said memory.

7. The method of claim 6, wherein said plurality of bus interconnects includes at least two configurable bus interconnects, said allocating step further includes the step of determining a number of said configurable bus interconnects to assign to each of a memory component and a second processor chip, wherein less than all of said configurable buses may be assigned to a single external component.

8. The method of claim 6, wherein said allocating step further includes the step setting a mode register within a bus allocation unit, said mode register indicating to a processor of said processor chip a present configuration of said at least one configurable bus.

9. The method of claim 8, wherein said step of setting a mode register includes the step of assigning a value to each of a plurality of mode control bits, wherein said value is assigned via external programming and is stored within said mode register.

10. A system for improving chip efficiency utilizing scalable allocation of configurable bus interconnects on a processor chip, said system comprising:
    a bus allocation unit designed on said processor chip, said bus allocation unit having bus allocation logic for determining priorities of bandwidth requirements and allocation of bus interconnects;

a plurality of bus interconnects including one or more configurable bus interconnects;

means for allocating said one or more configurable bus interconnects to an external component based on vendor settings, wherein said allocating means further includes:

means for comparing a bandwidth requirement of a memory component with a second processor chip bandwidth requirement based on system design needs, wherein said allocating means is responsive to a result of said comparing means to permit greater efficiency in system processing; and means for encoding a bus configuration into said bus allocation unit.

11. A system for improving chip efficiency utilizing scalable allocation of configurable bus interconnects on a processor chip, said system comprising:

a bus allocation unit designed on said processor chip, said bus allocation unit having bus allocation logic for determining priorities of bandwidth requirements and allocation of bus interconnects;

a plurality of bus interconnects including at least two configurable bus interconnects; and means for allocating said at least two configurable bus interconnects to an external component based on vendor settings, said allocating means further includes means for determining a number of said configurable bus interconnects to assign to each of a memory component and a second processor chip, wherein less than all of said configurable buses may be assigned to a single external component.

12. A processor chip comprising:

a processor unit;

a plurality of bus interconnects utilized for coupling external components to said processor chip, wherein at least one of said bus interconnects is a configurable bus that maybe allocated to any one of at least two different external components coupled to said processor chip including another processor and a memory; and means for selectively allocating said at least one configurable bus to one of said external components selected from among said other processor and said memory.

13. A processor chip according to claim 12 further comprising:

a bus allocation unit, said bus allocation unit having bus allocation logic for determining priorities of bandwidth requirements of components that are external to said processor chip and connected to said processor chip via said plurality of bus interconnects and allocation of bus interconnects based on said priorities; and means for allocating said one or more configurable bus interconnects to an external component based on vendor settings.

14. The system of claim 13, wherein said allocating means further includes means for setting a mode register within said bus allocation unit, said mode register indicating to a processor of said processor chip a present configuration of said plurality of buses.

15. The processor chip of claim 12, further comprising a mode register, said mode register being settable by hardware and software and containing a value which indicates to said processor which external component to allocate said configurable bus to.

16. The processor chip of claim 12, further comprising N mode bits that together provides $2^N$ possible allocation states for said configurable buses.

17. The processor chip of claim 16, wherein one allocation state of said $2^N$ possible allocation states indicates that dynamic, software-based allocation is to be implemented.

18. The processor chip of claim 17, wherein at least one allocation state of said $2^N$ possible allocation states indicates which one of several possible dynamic, software-based allocation to implement.

19. A processor chip comprising:

a processor unit;

a plurality of bus interconnects utilized for coupling external components to said processor, wherein at least one of said bus interconnects is a configurable bus that may be allocated to any one of at least two different external components, wherein said external components include a memory and a second processor chip;

means for selectively allocating said at least one configurable bus to one of said external components, said selectively allocating means including:

a pin located on a surface of said processor chip, said pin being placeable in either a first or a second position, wherein said first position results in an allocation of said configurable bus to said memory and said second position results in an allocation of said configurable bus to said second processor chip.

20. A processor chip comprising:

a processor unit;

a plurality of bus interconnects utilized for coupling external components to said processor, wherein at least one of said bus interconnects is a configurable bus that maybe allocated to any one of at least two different external components, wherein said external components include a memory and a second processor chip;

means for selectively allocating said at least one configurable bus to one of said external components, wherein said means for selectively allocating includes:

a pin located on a surface of said processor chip, wherein a position of said pin provides an indicator to a processor whether to utilize a hardware allocation or a software manipulated allocation of configurable buses.

21. The processor chip of claim 20, wherein said pin is a mode control pin with an associated mode register capable of being assigned a value via external programming, wherein said value is stored in said mode register, which controls the allocation of said configurable buses.

22. A processor chip comprising:

a processor unit;

a plurality of bus interconnects utilized for coupling external components to said processor, wherein at least one of said bus interconnects is a configurable bus that may be allocated to any one of at least two different external components;

means for selectively allocating said at least one configurable bus to one of said external components;

a mode register, said mode register being settable by hardware and software and containing a value which indicates to said processor which external component to allocate said configurable bus to; and means for setting the value of said mode register during a power-on-reset sequence.

* * * * *